United States Patent
Tanaka et al.

(10) Patent No.: US 10,584,232 B2
(45) Date of Patent: Mar. 10, 2020

(54) RESIN COMPOSITION AND RESIN MOLDED ARTICLE THEREOF

(71) Applicant: FUJI XEROX CO., LTD., Tokyo (JP)

(72) Inventors: Ryo Tanaka, Kanagawa (JP); Kana Miyazaki, Kanagawa (JP); Masahiro Moriyama, Kanagawa (JP); Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/943,013

(22) Filed: Apr. 2, 2018

(65) Prior Publication Data

US 2019/0092929 A1 Mar. 28, 2019

(30) Foreign Application Priority Data

Sep. 26, 2017 (JP) ................. 2017-184701

(51) Int. Cl.
*C08L 1/14* (2006.01)

(52) U.S. Cl.
CPC ............. *C08L 1/14* (2013.01); *C08L 2205/03* (2013.01); *C08L 2205/06* (2013.01)

(58) Field of Classification Search
CPC ..... C08L 1/14; C08L 2205/03; C08L 2205/06
See application file for complete search history.

(56) References Cited

U.S. PATENT DOCUMENTS

| 2,668,182 | A | | 2/1954 | Miller | |
|---|---|---|---|---|---|
| 4,057,357 | A | * | 11/1977 | Daghe | B23B 51/0433 408/67 |
| 4,626,570 | A | * | 12/1986 | Gardner | C08G 63/553 525/12 |
| 2007/0004813 | A1 | * | 1/2007 | Shelby | B29C 55/005 521/134 |
| 2009/0075048 | A1 | * | 3/2009 | Mukunoki | C08J 5/18 428/220 |
| 2010/0233389 | A1 | * | 9/2010 | Suzuki | C08J 5/18 428/1.33 |

FOREIGN PATENT DOCUMENTS

| JP | S59-96123 | A | | 6/1984 |
|---|---|---|---|---|
| JP | H07-33861 | A | | 2/1995 |
| JP | 2008133445 | A | * | 6/2008 |
| JP | 5298496 | B2 | | 9/2013 |

OTHER PUBLICATIONS

JP-2008133445-A (Year: 2008).*

* cited by examiner

*Primary Examiner* — Travis M Figg
(74) *Attorney, Agent, or Firm* — Oliff PLC

(57) ABSTRACT

A resin composition includes a cellulose ester compound (A); polylactic acid (B); and a polystyrene (meth)acrylate-based compound (C) containing 10% by mass or more and 40% by mass or less of a constituent unit derived from styrene.

12 Claims, No Drawings

RESIN COMPOSITION AND RESIN MOLDED ARTICLE THEREOF

CROSS-REFERENCE TO RELATED APPLICATIONS

This application is based on and claims priority under 35 USC 119 from Japanese Patent Application No. 2017-184701 filed Sep. 26, 2017.

BACKGROUND (i) Technical Field

The present invention relates to a resin composition and a resin molded article thereof.

(ii) Related Art

Various resin compositions have been proposed and used for various applications. In particular, resin compositions are used for various parts, housings, etc. of home electric appliances, automobiles, and the like. In addition, thermoplastic resins are used for parts such as housings and the like of office equipment, electronic/electric equipment, and the like.

In recent years, plant-derived resins have been used, and one of the plant-derived resins which have been known is a cellulose ester compound.

SUMMARY

According to an aspect of the invention, there is provided a resin composition containing a cellulose ester compound (A), polylactic acid (B), and a polystyrene (meth)acrylate-based compound (C) containing 10% by mass or more and 40% by mass or less of a constituent unit derived from styrene or the like.

DETAILED DESCRIPTION

An exemplary embodiment of the invention is described below.

In the specification of the invention, when plural materials corresponding to each component are present in an object, the amount of each component in the object represents the total content or amount of the plural materials present in the object unless otherwise specified.

—Resin Composition—

A resin composition according to an exemplary embodiment of the invention contains a cellulose ester compound (A), polylactic acid (B), and a polystyrene (meth)acrylate-based compound (C) containing 10% by mass or more and 40% by mass or less of a constituent unit derived from styrene or the like. The resin composition according to the exemplary embodiment may further contain other components.

The cellulose ester compound (A) (particularly, cellulose acylate having hydroxyl groups partially substituted by acyl groups) is derived from non-edible resources and is a first derivative not requiring chemical polymerization, and thus it is an environmentally friendly resin material. Also, the cellulose ester compound (A) has a high elastic modulus as a resin material and further has a high transparency property.

On the other hand, the cellulose ester compound (A) tends to be fragile due to its low impact resistance. There is known a technique of producing a resin composition by mixing a poly(meth)acrylate compound with the cellulose ester compound (A) for the purpose of improving the impact resistance of the cellulose ester compound (A). However, a resin molded article molded by using the resin composition usually tends to be decreased in transparency and puncture resistance.

The factor for decreasing puncture resistance is unclear but is supposed as follows. A resin composition containing a cellulose ester compound tends to have a high melt viscosity during molding. Therefore, molecular chains hardly move during molding, and molding may be performed in a state where molecular chains are oriented. A resin molded article molded in the state where the molecular chains are oriented is easily broken along the orientation direction of the molecular chains. Therefore, the puncture resistance of the resin molded article is easily decreased.

However, the resin composition according to the exemplary embodiment contains the cellulose ester compound (A), the polylactic acid (B), and the polystyrene (meth)acrylate-based compound (C), and the polystyrene (meth)acrylate-based compound (C) contains 10% by mass or more and 40% by mass or less of the constituent unit derived from styrene. It is thus possible to produce a resin molded article having excellent puncture resistance while suppressing a decrease in transparency.

The function of suppressing a decrease in transparency is supposed as follows. The expression "a resin molded article having high transparency" represents that a resin molded article slightly absorbs visible light and slightly scatters light. The refractive index levels of the component (A), the component (B), and the component (C) increase in the order of component (C)>component (A)>component (B). Even when the component (A) and the component (B) having different refractive indexes are mixed, transparency is decreased due to light scattering. Therefore, when besides the component (A) and the component (B), the component (C) compatible with the component (B) is mixed, the refractive index of a phase (referred to as a "phase (B+C)" hereinafter) in which the component (B) and the component (C) are compatible with each other comes close to that of a phase (A) as compared with a phase (B) containing the component (B) alone, thereby suppressing light scattering. As a result, a resin molded article with suppressed decrease in transparency can be produced.

The function of producing a resin molded article having excellent puncture resistance is supposed as follows.

The polystyrene (meth)acrylate-based compound (C) containing the constituent unit derived from styrene has a lower refractive index than that of a poly(meth)acrylate-based compound not containing the constituent unit derived from styrene. Therefore, when polylactic acid is compatibilized with the component (C) to bring the refractive index close to that of the component (A), the polylactic acid having a low refractive index can be contained in a large amount as compared with a system containing only the poly(meth)acrylate-based compound. Also the polylactic acid has the function of decreasing the melt viscosity of the resin composition. Thus, kneading the component (A), the component (B), and the component (C) decreases the melt viscosity of the resin composition during molding. With the decreased melt viscosity, the resin composition extruded in a direction by injection molding or the like is easily brought from the state where the molecular chains are oriented into a state where the molecular chains are disordered. Then, the resin molded article in the state where the molecular chains are disordered is molded. As a result, the resultant resin molded article is hard to break along the orientation direction of the molecular chains and has excellent puncture resistance because the molecular chains are in the disordered orientation state.

The components of the resin composition according to the exemplary embodiment are described in detail below.

[Cellulose Ester Compound (A): Component (A)]

The cellulose ester compound (A) is, for example, a resin of a cellulose derivative (cellulose acylate) in which hydroxyl groups of cellulose are at least partially substituted (acylated) by acyl groups. Specifically, the cellulose ester compound (A) is, for example, a cellulose derivative represented by a general formula (CE).

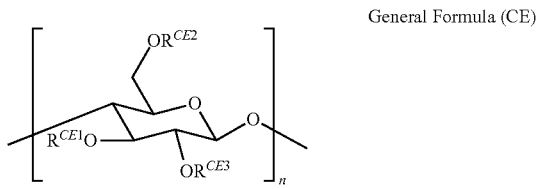

General Formula (CE)

In the general formula (CE), $R^{CE1}$, $R^{CE2}$, and $R^{CE3}$ each independently represent a hydrogen atom or an acyl group, and n represents an integer of 2 or more. However, at least some of n $R^{CE1}$ groups, n $R^{CE2}$ groups, and n $R^{CE3}$ groups represent acyl groups.

In addition, an acyl group represented by each of $R^{CE1}$, $R^{CE2}$, and $R^{CE3}$ is preferably an acyl group having 1 or more and 6 or less carbon atoms.

In the general formula (CE), the range of n is not particularly limited, but n is preferably 200 or more and 1000 or less and more preferably 500 or more and 1000 or less.

In the general formula (CE), the expression "$R^{CE1}$, $R^{CE2}$, and $R^{CE3}$ each independently represent an acyl group" represents that at least some of hydroxyl groups of a cellulose derivative represented by the general formula (CE) are acylated.

That is, n $R^{CE1}$ groups in the molecule of the cellulose derivative represented by the general formula (CE) may be all the same, partially the same, or different from each other. Similarly, n groups of each of $R^{CE2}$ and $R^{CE3}$ may be all the same, partially the same, or different from each other.

The cellulose ester compound (A) preferably has an acyl group having 1 or more and 6 or less carbon atoms. In this case, the resin composition is easily produced, which provides a resin molded article having excellent puncture resistance while suppressing a decrease in transparency as compared with a case having an acyl group having 7 or more carbon atoms.

An acyl group is represented by the structure of "—CO—$R^{AC}$" wherein $R^{AC}$ represents a hydrogen atom or a hydrocarbon group (more preferably a hydrocarbon group having 1 or more and 5 or less carbon atoms).

A hydrocarbon group represented by $R^{AC}$ may be linear, branched, or cyclic, but is preferably linear.

A hydrocarbon group represented by $R^{AC}$ may be either a saturated hydrocarbon group or an unsaturated hydrocarbon group, but is preferably a saturated hydrocarbon group.

A hydrocarbon group represented by $R^{AC}$ may have an atom (for example, oxygen, nitrogen, or the like) other than carbon and hydrogen, but is preferably a hydrocarbon group having only carbon and hydrogen.

Examples of the acyl group include a formyl group, an acetyl group, a propionyl group, a butyryl group (butanoyl group), a propenoyl group, a hexanoyl group, and the like.

Among these, from the viewpoint of suppressing a decrease in transparency of, and improving puncture resistance of, the resultant resin composition, the acyl group is preferably an acyl group having 2 or more and 4 or less carbon atoms and more preferably an acyl group having 2 or more and 3 or less carbon atoms.

Examples of the cellulose ester compound (A) include cellulose acetate (cellulose monoacetate, cellulose diacetate (DAC), and cellulose triacetate), cellulose acetate propionate (CAP), cellulose acetate butyrate (CAB), and the like.

These cellulose ester compounds (A) may be used alone or in combination of two or more.

Among these, from the viewpoint of suppressing a decrease in transparency of, and improving puncture resistance of, the resultant resin molded article, cellulose acetate propionate (CAP) and cellulose acetate butyrate (CAB) are preferred and cellulose acetate propionate (CAP) is more preferred.

From the viewpoint of suppressing a decrease in transparency of, and improving puncture resistance of, the resultant resin molded article, the weight-average polymerization degree of the cellulose ester compound (A) is preferably 200 or more and 1000 or less and more preferably 500 or more and 1000 or less.

The weight-average polymerization degree is determined from the weight-average molecular weight (Mw) according to the following procedures.

First, the weight-average molecular weight (Mw) of the cellulose ester compound (A) is measured in terms of polystyrene by using a gel permeation chromatography apparatus (GPC apparatus: HLC-8320GPC manufactured by Tosoh Corporation, column: TSK gel α-M) using tetrahydrofuran.

Next, the weight-average polymerization degree of the cellulose ester compound (A) is determined by dividing by the molecular weight of the constituent unit of the cellulose ester compound (A). When a substituent of cellulose acylate is an acetyl group, the molecular weight of the constituent unit with a degree of substitution of 2.4 is 263 and that with a degree of substitution of 2.9 is 284.

From the viewpoint of suppressing a decrease in transparency of, and improving puncture resistance of, the resultant resin molded article, the degree of substitution of the cellulose ester compound (A) is preferably 2.1 or more and 2.8 or less, more preferably 2.2 or more and 2.8 or less, still more preferably 2.3 or more and 2.75 or less, and particularly preferably 2.35 or more and 2.75 or less.

From the viewpoint of suppressing a decrease in transparency of, and improving puncture resistance of, the resultant resin molded article, the ratio (acetyl group/propionyl group) of a degree of substitution of an acetyl group to a degree of substitution of a propionyl group in the cellulose acetate propionate (CAP) is preferably 5/1 or more and 1/20 or less and more preferably 3/1 or more and 1/15 or less.

From the viewpoint of suppressing a decrease in transparency of, and improving puncture resistance of, the resultant resin molded article, the ratio (acetyl group/butyryl group) of a degree of substitution of an acetyl group to a degree of substitution of a butyryl group in the cellulose acetate butyrate (CAB) is preferably 5/1 or more and 1/20 or less and more preferably 4/1 or more and 1/15 or less.

The degree of substitution is an index indicating the degree to which the hydroxyl groups possessed by cellulose are substituted by acyl groups. That is, the degree of substitution becomes an index indicating the degree of acylation of the cellulose ester compound (A). Specifically, the degree of substitution represents an intramolecular average of the number of acyl groups as substituents for the three hydroxyl groups present in a D-glucopyranose unit of cellulose acylate.

The degree of substitution is determined from an integration ratio between a peak of cellulose-derived hydrogen and a peak derived from acyl groups in $H^1$-NMR (JMN-ECA/ manufactured by JEOL RESONANCE Inc.).

[Polylactic Acid (B): Component (B)]

The polylactic acid (B) according to the exemplary embodiment is a polymer compound in which lactic acid is polymerized by an ester bond.

Examples of the polylactic acid (B) include an L-lactic acid homopolymer, a D-lactic acid homopolymer, a block copolymer containing at least one of L-lactic acid and D-lactic acid polymers, and a graft copolymer containing at least one of L-lactic acid and D-lactic acid polymers.

Examples of a compound copolymerizable with L-lactic acid or D-lactic acid include polyvalent carboxylic acids and anhydrides thereof, such as glycolic acid, dimethylglycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, 4-hydroxyvaleric acid, oxalic acid, malonic acid, succinic acid, glutaric acid, adipic acid, pimelic acid, azelaic acid, sebacic acid, undecanedioic acid, dodecanedioic acid, terephthalic acid, and the like; polyhydric alcohols such as ethylene glycol, diethylene glycol, triethylene glycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentyl glycol, tetramethylene glycol, 1,4-hexanedimethanol, and the like; polysaccharides such as cellulose and the like; aminocarboxylic acids such as α-amino acid and the like; hydroxycarboxylic acids such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethylcaproic acid, mandelic acid, and the like; cyclic esters such as glycoride, β-methyl-δ-valerolactone, γ-valerolactone, ε-caprolactone, and the like; and the like.

It is known that the polylactic acid can be produced by a lactide method through a lactide, a direct polymerization method of heating lactic acid in a solvent under reduced pressure and then polymerizing lactic acid while removing water, or the like.

The "copolymer of L-lactic acid or D-lactic acid with a compound copolymerizable with L-lactic acid or D-lactic acid" is, for example, a block copolymer or graft copolymer having a polylactic acid sequence capable of producing a helical crystal.

A polylactic acid-based polymer can be produced by, for example, a method of direct dehydration condensation of lactic acid described in Japanese Unexamined Patent Application Publication Nos. 59-096123 and 7-033861, a method of ring-opening polymerization using lactide which is a lactic acid dimer described in U.S. Pat. Nos. 2,668,182 and 4,057,357, or the like.

In order that the optical purity of the polylactic acid-based polymer produced by each of the production methods is adjusted to 95.00% ee or more, for example, when polylactic acid is produced by the lactide method, it is preferred to polymerize lactide with the optical purity improved to 95.00% ee or more by a crystallization operation.

From the viewpoint of suppressing a decrease in transparency of, and improving puncture resistance of, the resultant resin molded article, the weight-average molecular weight (Mw) of the polylactic acid (B) is preferably 50,000 or more and 300,000 or less, more preferably 75,000 or more and 250,000 or less, and still more preferably 100,000 or more and 200,000 or less.

From the viewpoint of suppressing a decrease in transparency of, and improving puncture resistance of, the resultant resin molded article, the weight-average polymerization degree of the polylactic acid (B) is preferably 700 or more and 4200 or less and more preferably 1400 or more and 2800 or less.

The weight-average molecular weight (Mw) of the polylactic acid (B) is a value measured by gel permeation chromatography (GPC). Specifically, the molecular weight is measured by GPC using a measurement apparatus, HPLC1100 manufactured by Tosoh Corporation; a column, TSK gel GMHHR-M+TSK gel GMHHR-M (7.8 mm I.D. 30 cm) manufactured by Tosoh Corporation; and chloroform as a solvent. The weight-average molecular weight (Mw) is calculated from the measurement result by using a molecular weight calibration curve formed by a monodisperse polystyrene standard sample.

[Polystyrene (Meth)Acrylate-Based Compound (C): Component (C)]

The polystyrene (meth)acrylate-based compound (C) according to the exemplary embodiment is a copolymer having a constituent unit derived from styrene and a constituent unit derived from a (meth)acrylic acid alkyl ester.

If required, the polystyrene (meth)acrylate-based compound (C) may have a constituent unit derived from another polymerizable compound in addition to the constituent unit derived from styrene and the constituent unit derived from a (meth)acrylate-based compound.

The other polymerizable compound is not particularly limited as long as it is copolymerizable with styrene and the (meth)acrylate-based compound. For example, an unsaturated dicarboxylic acid anhydride can be used.

The styrene is a monomer having a styrene skeleton.

Examples of styrenes include styrene, alkyl-substituted styrene (for example, α-methylstyrene, 2-methylstyrene, 3-methylstyrene, 4-methylstyrene, 2-ethylstyrene, 3-ethylstyrene, 4-ethylstyrene, and the like), halogen-substituted styrene (for example, 2-chlorostyrene, 3-chlorostyrene, 4-chlorostyrene, and the like), vinylnaphthalene (2-vinylnaphthalene and the like), hydroxystyrene (4-ethenylphenol and the like), and the like. Among these, styrene is preferably used from the viewpoint of suppressing a decrease in transparency of, and improving puncture resistance of, the resultant resin molded article.

Examples of the (meth)acrylic acid alkyl ester include methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, isopropyl (meth)acrylate, isobutyl (meth)acrylate, tert-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, octyl (meth)acrylate, decyl (meth)acrylate, cyclohexyl (meth)acrylate, dicyclopentanyl (meth)acrylate, and the like.

From the viewpoint of suppressing a decrease in transparency of, and improving puncture resistance of, the resultant resin molded article, the (meth)acrylic acid alkyl ester has an alkyl chain having 1 or more and 8 or less carbon atoms, preferably 1 or more and 4 or less carbon atoms, more preferably 1 or more and 2 or less carbon atoms, and still more preferably 1 carbon atom. The poly(meth)acrylic acid alkyl ester having an alkyl chain having 1 carbon atom is preferably polymethyl methacrylate.

When the polystyrene (meth)acrylate-based compound (C) has a short alkyl chain having a small number of carbon atoms, the SP value of the polystyrene (meth)acrylate-based compound (C) is close to that of the polylactic acid (B), and thus compatibility between the poly(meth)acrylate-based compound (C) and the polylactic acid (B) is improved, thereby improving haze. Therefore, the resin composition which provides a resin molded article with suppressed decrease in transparency can be easily produced.

Examples of the unsaturated dicarboxylic acid anhydride include maleic anhydride, itaconic anhydride, glutaconic anhydride, citraconic anhydride, aconitic anhydride, and the like. Among these, maleic anhydride is preferred. These can be used alone or in combination of two or more.

The polystyrene (meth)acrylate-based compound (C) is not particularly limited as long as it is a copolymer containing constituent units derived from styrene and the (meth)acrylic acid alkyl ester. However, the polystyrene (meth)acrylate-based compound (C) is preferably at least one selected from a copolymer of styrene with the (meth)acrylic acid alkyl ester having an alkyl chain having 1 or more and 8 or less carbon atoms, and a copolymer of styrene with the (meth)acrylic acid alkyl ester having an alkyl chain having 1 or more and 8 or less carbon atoms and the unsaturated dicarboxylic acid anhydride.

Among these, from the viewpoint of suppressing a decrease in transparency of, and improving puncture resistance of, the resultant resin molded article, the polystyrene (meth)acrylate-based compound (C) is preferably at least one selected from a copolymer of styrene with methyl methacrylate, and a copolymer of styrene with methyl methacrylate and maleic anhydride.

Examples of commercial products of the polystyrene (meth)acrylate-based compound (C) include Delpet 980N manufactured by Asahi Kasei Corporation, MS-600 manufactured by Nippon Steel & Sumikin Chemical Co., Ltd., MS-800 manufactured by Nippon Steel & Sumikin Chemical Co., Ltd., TX-100S manufactured by Denka Company Limited, and the like.

Among these, from the viewpoint of suppressing a decrease in transparency of, and improving puncture resistance of, the resultant resin molded article, Delpet 980N manufactured by Asahi Kasei Corporation and TX-100S manufactured by Denka Company Limited are preferred.

The sequence of monomers in the polystyrene (meth) acrylate-based compound (C) is not particularly limited, and the polystyrene (meth)acrylate-based compound (C) may be a graft copolymer, an alternating copolymer, a random copolymer, or a block copolymer.

Among these, a block copolymer is preferred from the viewpoint of suppressing a decrease in transparency of, and improving puncture resistance of, the resultant resin molded article.

From the viewpoint of suppressing a decrease in transparency of, and improving puncture resistance of, the resultant resin molded article, the content of the constituent unit derived from styrene in the copolymer as the polystyrene (meth)acrylate-based compound (C) is 10% by mass or more and 40% by mass or less, preferably 15% by mass or more and 35% by mass or less, and more preferably 15% by mass or more and 25% by mass or less.

When the content of the constituent unit derived from styrene in the polystyrene (meth)acrylate-based compound (C) is 10% by mass or more and 40% by mass or less, a resin molded article having excellent puncture resistance while suppressing a decrease in transparency can be produced.

The content of the constituent unit derived from the (meth)acrylic acid alkyl ester in the polystyrene (meth) acrylate-based compound (C) is 50% by mass or more, preferably 60% by mass or more, and more preferably 70% by mass. The upper limit of the content of the constituent unit derived from the (meth)acrylic acid alkyl ester is 90% by mass.

When the content of the constituent unit derived from the (meth)acrylic acid alkyl ester in the polystyrene (meth) acrylate-based compound (C) is 50% by mass or more, a resin molded article having excellent puncture resistance while suppressing a decrease in transparency can be easily produced.

The weight-average molecular weight (Mw) of the polystyrene (meth)acrylate-based compound (C) is not particularly limited but is 27,000 or more and 140,000 or less (preferably over 30,000 and 140,000 or less, more preferably 35,000 or more and 140,000 or less, and still more preferably 40,000 or more and 140,000 or less).

From the viewpoint of suppressing a decrease in transparency of, and improving puncture resistance of, the resultant resin molded article, the weight-average molecular weight (Mw) of the polystyrene (meth)acrylate-based compound (C) is less than 50,000, preferably 30,000 or more and less than 50,000, more preferably 35,000 or more and less than 50,000, and still more preferably 40,000 or more and 50,000 or less.

When the weight-average molecular weight (Mw) of the polystyrene (meth)acrylate-based compound (C) is less than 50,000, the resin composition which provides a resin molded article having excellent puncture resistance thereof can be produced.

The weight-average molecular weight (Mw) of the polystyrene (meth)acrylate-base compound (C) is a value measured by gel permeation chromatography (GPC). Specifically, the molecular weight is measured by GPC using a measurement apparatus, HLC-8320GPC manufactured by Tosoh Corporation; a column, TSK gel α-M manufactured by Tosoh Corporation; and tetrahydrofuran as a solvent. The weight-average molecular weight (Mw) is calculated from the measurement result by using a molecular weight calibration curve formed by a monodisperse polystyrene standard sample.

[Content or Mass Ratio of Component (A) to Component (C)]

The content or mass ratio of each of the components is described. From the viewpoint of suppressing a decrease in transparency of, and improving puncture resistance of, the resultant resin molded article, the content or mass ratio of each of the components is preferably within a range below. Abbreviations of the components are as follows.

Component (A)=cellulose ester compound (A)
Component (B)=polylactic acid (B)
Component (C)=polystyrene (meth)acrylate-based compound (C)

The mass ratio [(A)/((A)+(B)+(C))] of the component (A) to the total of the component (A), the component (B), and the component (C) is preferably 0.5 or more and 0.96 or less, more preferably 0.75 or more and 0.93 or less, and still more preferably 0.8 or more and 0.9 or less.

The mass ratio [(B)/((A)+(B)+(C))] of the component (B) to the total of the component (A), the component (B), and the component (C) is preferably 0.01 or more and 0.17 or less, more preferably 0.02 or more and 0.11 or less, and still more preferably 0.025 or more and 0.07 or less.

The mass ratio [(C)/((A)+(B)+(C))] of the component (C) to the total of the component (A), the component (B), and the component (C) is preferably 0.01 or more and 0.17 or less, more preferably 0.02 or more and 0.11 or less, and still more preferably 0.025 or more and 0.11 or less.

From the viewpoint of suppressing a decrease in transparency of, and improving puncture resistance of, the resultant resin molded article, the content of the component (A) in the resin composition is preferably 45% by mass or more, more preferably 50% by mass or more, and still more preferably 65% by mass or more.

In particular, when the content of the cellulose ester compound (A) in the resin composition is 50% by mass or more, the resin composition which produces a resin molded article having excellent rigidity can be easily produced as compared with the case where the content of the cellulose ester compound (A) is less than 50% by mass.

The mass ratio of the component (C) to the total of the component (B) and the component (C) is 0.10 or more and 0.6 or less, preferably 0.15 or more and 0.55 or less, and more preferably 0.2 or more and 0.45 or less.

In particular, when mass ratio of the polystyrene (meth) acrylate-based compound (C) to the total of the polylactic acid (B) and the polystyrene (meth)acrylate-based compound (C) is 0.15 or more, the resin composition which produces a resin molded article having excellent puncture resistance thereof can be easily produced. On the other hand, when mass ratio of the polystyrene (meth)acrylate-based compound (C) to the total of the polylactic acid (B) and the polystyrene (meth)acrylate-based compound (C) is 0.55 or less, the resin composition which produces a resin molded article with suppressed decrease in transparency can be easily produced.

The total mass ratio of the component (B) and the component (C) to the component (A) is 0.03 or more and less than 1, preferably 0.05 or more and less than 1, and more preferably 0.1 or more and 0.5 or less.

In particular, when total mass ratio of the polylactic acid (B) and the polystyrene (meth)acrylate-based compound (C) to the cellulose ester compound (A) is 0.05 or more, the resin composition which produces a resin molded article having excellent puncture resistance can be provided. While when the total mass ratio of the polylactic acid (B) and the polystyrene (meth)acrylate-based compound (C) to the cellulose ester compound (A) is less than 1, the resin composition which produces a resin molded article having suppressed decrease in transparency can be easily produced.

[Other Components]

The resin composition according to the exemplary embodiment may contain a plasticizer and a thermoplastic elastomer.

(Plasticizer)

Examples of the plasticizer include an adipic acid ester-containing compound, a polyether ester compound, a sebacic acid ester compounds, a glycol ester compound, an acetic acid ester, a dibasic acid ester compound, a phosphoric acid ester compound, a phthalic acid ester compound, camphor, a citric acid ester, a stearic acid ester, a metal soap, a polyol, a polyalkylene oxide, and the like. Among these, the adipic acid ester-containing compound and the polyether ester compound are preferred, and the adipic acid ester-containing compound is more preferred.

The content of the plasticizer is preferably such that the ratio of the cellulose ester compound (A) in the whole of the resin composition is within the range described above. More specifically, the ratio of the plasticizer in the whole of the resin composition is preferably 15% by mass or less, more preferably 10% by mass or less, and still more preferably 5% by mass or less. With the ratio of the plasticizer within the range, elastic modulus is further increased, and heat resistance is further increased. Also, bleeding of the plasticizer is suppressed.

(Thermoplastic Elastomer)

The thermoplastic elastomer is, for example, an elastomer having rubber properties at room temperature (25° C.) and the property of softening at a high temperature like thermoplastic resins. Examples of the thermoplastic elastomer include a (meth)acrylic thermoplastic elastomer, a styrene-based thermoplastic elastomer, and the like.

The (meth)acrylic thermoplastic elastomer is, for example, a polymer of two or more (meth)acrylic acid alkyl esters, a polymer of an olefin and (meth)acrylic acid alkyl ester, or the like. Specific examples thereof include polymethyl methacrylate-poly n-butyl acrylate)-polymethyl methacrylate block copolymer, polymethyl methacrylate-polydodecyl methacrylate-polymethyl methacrylate block copolymer, polymethyl methacrylate-poly 2-ethylhexyl methacrylate-polymethyl methacrylate block copolymer, polymethyl methacrylate-polylauryl methacrylate-polymethyl methacrylate block copolymer, ethylene-methyl acrylate block copolymer, and the like.

The styrene-based thermoplastic elastomer is, for example, a copolymer of styrene (monomer having a styrene skeleton) and an olefin, a copolymer of styrene and conjugated diene, a copolymer of styrene, conjugated diene, and olefin, or the like. Specific examples thereof include polystyrene-polybutadiene-polystyrene block copolymer, polystyrene-polybutadiene-polybutylene-polystyrene block copolymer, polystyrene-polyethylene-polybutylene-polystyrene block copolymer, polystyrene-polyisoprene-polystyrene block copolymer, polystyrene-hydrogenated polybutadiene-polystyrene block copolymer, polystyrene-hydrogenated polyisoprene-polystyrene block copolymer, polystyrene-polyisoprene-hydrogenated butadiene-polystyrene block copolymer, and the like.

The content of the thermoplastic elastomer is preferably 3% by mass or more and 30% by mass or less relative to the resin composition.

(Components Other than Plasticizer and Thermoplastic Elastomer)

The resin composition according to the exemplary embodiment may contain components other than the plasticizer and the thermoplastic elastomer described above. Examples of the other components include a flame retardant, a compatibilizer, an antioxidant, a mold release agent, a light resistant agent, a weathering agent, a coloring agent, a pigment, a modifier, an anti-drip agent, an antistatic agent, a hydrolysis resistant agent, a filler, a reinforcing agent (glass fiber, carbon fibers, talc, clay, mica, glass flake, milled glass, glass beads, crystalline silica, alumina, silicon nitride, aluminum nitride, boron nitride, or the like), and the like.

If required, components (additives) such as an acid acceptor for preventing acetic acid release, a reactive trap agent, and the like may be added. Examples of the acid acceptor include oxides such as magnesium oxide, aluminum oxide, and the like; metal hydroxides such as magnesium hydroxide, calcium hydroxide, aluminum hydroxide, hydrotalcite, and the like; calcium carbonate; talc; and the like.

Examples of the reactive trap agent include an epoxy compound, an acid anhydride compound, carbodiimide, and the like.

The content of each of these components is preferably 0% by mass or more and 5% by mass or less relative to the total amount of the resin composition. The content "0% by mass" represents not containing the other component.

The resin composition according to the exemplary embodiment may contain a resin other than the resins (the cellulose ester compound (A), the polylactic acid (B), and the polystyrene (meth)acrylate-based compound (C)) described above. However, when the other resin is contained, the content of the other resin is preferably 5% by mass or less and more preferably less than 1% by mass relative to the total amount of the resin composition. The other resin is more preferably not contained (that is, 0% by mass).

The other resin is, for example, a general known thermoplastic resin. Specific examples thereof include polycarbonate resins; polypropylene resins; polyester resins; polyolefin resins; polyester carbonate resins; polyphenylene ether resins; polyphenylene sulfide resins; polysulfone resins; polyether sulfone resins; polyarylene resins; polyetherimide resins; polyacetal resins; polyvinylacetal resins; polyketone resins; polyether ketone resins; polyether ether ketone resins; polyaryl ketone resins; polyether nitrile resins; liquid crystal resins; polybenzimidazole resins; polyparabanic acid resins; vinyl polymers or copolymers produced by polymerizing or copolymerizing one or more vinyl monomers selected from the group consisting of aromatic alkenyl compounds, methacrylic acid esters, acrylic acid esters, and vinyl cyanide compounds; diene-aromatic alkenyl compound copolymers; vinyl cyanide-diene-aromatic alkenyl compound copolymers; aromatic alkenyl compound-diene-vinyl cyanide-N-phenylmaleimide copolymers; vinyl cyanide-(ethylene-diene-propylene (EPDM))-aromatic alkenyl compound copolymers; vinyl chloride resins; chlorinated vinyl chloride resins; and the like. These resins may be used alone or in combination of two or more.

[Method for Producing Resin Composition]

A method for producing the resin composition according to the exemplary embodiment includes, for example, preparing a resin composition containing the cellulose ester compound (A), the polylactic acid (B), and the polystyrene (meth)acrylate-based compound (C).

The resin composition according to the exemplary embodiment is produced by melt-kneading a mixture containing the cellulose ester compound (A), the polylactic acid (B), and the polystyrene (meth)acrylate-based compound (C), and if required, other components. Also, the resin composition according to the exemplary embodiment is produced by, for example, dissolving the components in a solvent.

A known method can be used as a melt-kneading method. Specific examples thereof include a twin-screw extruder, a Henschel mixer, a Banbury mixer, a mono-screw extruder, a multi-screw extruder, a co-kneader, and the like.

—Resin Molded Article—

A resin molded article according to an exemplary embodiment contains the resin composition according to the exemplary embodiment. That is, the resin molded article according to the exemplary embodiment is made of the same composition as the resin composition according to the exemplary embodiment.

In view of a high degree of shape freedom, a method for molding the resin molded article according to the exemplary embodiment is preferably injection molding. In view of this point, the resin molded article is an injected molded article produced by injection molding.

The cylinder temperature of injection molding is, for example, 160° C. or more and 280° or less and preferably 180° C. or more and 260° C. or less. The mold temperature of injection molding is, for example, 40° C. or more and 90° or less and preferably 60° C. or more and 80° C. or less.

Injection molding may be performed by using a commercial apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., PNX40 manufactured by Nissei Plastic Industrial Co., Ltd., SE50D manufactured by Sumitomo Heavy Industries, Ltd., and the like.

The method for molding the resin molded article according to the exemplary embodiment is not limited to the injection molding and, for example, extrusion molding, blow molding, hot press molding, calender molding, coating molding, cast molding, dipping molding, vacuum molding, transfer molding, or the like may be applied.

When the resin molded article according to the exemplary embodiment has a thickness of 2 mm, the haze value thereof is 10% or less (preferably 7% or less). When the resin molded article having a thickness of 2 mm has a haze value of 10% or less, the resin molded article is considered to have transparency.

The ideal value of the haze value of the resin molded articles is 0%, but the haze value is preferably 0.5% or more from the viewpoint of production.

The haze value of the resin molded article is a value measured by a method described in examples.

The resin molded article according to the exemplary embodiment is preferably used for applications such as electronic/electric equipment, office equipment, home electric appliances, automobile interior materials, toys, containers, etc. Specific examples thereof include housings of electronic/electric equipment and home electric appliances, various parts of electronic/electric equipment and home electric appliances, interior parts of automobiles, block assembly toys, plastic model kits, housing cases of CD-ROM, DVD, and the like, tableware, drink bottles, food trays, wrapping materials, films, sheets, and the like.

EXAMPLE

The present invention is described in further detail below on the basis of examples, but the present invention is not limited to the examples below. In addition, "parts" represents "parts by mass" unless otherwise specified.

[Preparation of Materials]

Materials described below are prepared.

—Preparation of Cellulose Ester Compound (A)—

CE1: cellulose acetate propionate
(CAP482-20 manufactured by EASTMAN CHEMICAL COMPANY)

CE2: cellulose acetate butyrate
(CAB171-15 manufactured by EASTMAN CHEMICAL COMPANY)

CE3: cellulose acetate butyrate
(CAB381-20 manufactured by EASTMAN CHEMICAL COMPANY)

CE4: cellulose acetate butyrate
(CAB500-5 manufactured by EASTMAN CHEMICAL COMPANY)

CE5: cellulose diacetate (DAC)
(L-50 manufactured by Daicel Corporation)

The degrees of substitution of the cellulose ester compounds are shown in Table 1. In the table, DPw represents the weight-average polymerization degree, DS(Ac), DS(Pr), DS(Bt) represent the degrees of substitution of an acetyl group, a propionyl group, a butyryl group, respectively.

TABLE 1

| Type of cellulose ester compound (A) | DPw | DS(Ac) | DS(Pr) | DS(Bt) |
| --- | --- | --- | --- | --- |
| CE1 | 716 | 0.18 | 2.49 | — |
| CE2 | 754 | 2.07 | — | 0.73 |
| CE3 | 890 | 1.05 | — | 1.74 |
| CE4 | 625 | 0.17 | — | 2.64 |
| CE5 | 570 | 2.45 | — | — |

—Preparation of Polylactic Acid (B)—
B1: polylactic acid resin
(Ingeo biopolymer 3001D manufactured by Nature Works)
—Preparation of Polystyrene (Meth)Acrylate-Based Compound (C)—
C1: polymethyl methacrylate homopolymer
(weight-average molecular weight=95,000)
(Sumipex MHF manufactured by Sumitomo Chemical Co., Ltd.)
C2: copolymer of methyl methacrylate, styrene, and maleic anhydride
(mass ratio=67:19:14, weight-average molecular weight=110,000)
(Delpet 980N manufactured by Asahi Kasei Corporation)
C3: copolymer of methyl methacrylate and styrene
(mass ratio=60:40, weight-average molecular weight=105,000)
(TX-100S manufactured by Denka Company Limited)
C4: copolymer of methyl methacrylate and styrene
(mass ratio=92:8, weight-average molecular weight=97,000)
(synthetic product)
C5: copolymer of methyl methacrylate and styrene
(mass ratio=81:19, weight-average molecular weight=48,000)
(synthetic product)
C6: copolymer of methyl methacrylate and styrene
(mass ratio=80:20, weight-average molecular weight=130,000)
(Estyrene MS-800 manufactured by Nippon Steel & Sumikin Chemical Co., Ltd.)

The charge ratios of monomers and the composition ratios of constituent units derived from the monomers in the copolymers C2 to C6 are shown in Table 2. In Table 2, MMA, St, and MAH represent methyl methacrylate, styrene, and maleic anhydride, respectively. In the column "Composition ratio", the constituent unit derived from each of the monomers is shown. In addition, in Table 2, the amount of each of the monomers charged for C2, C3, and C6 is denoted by "-" because C2, C3, and C6 are commercial products.

The method for synthesizing C4 and C5 is described below.

Methyl methacrylate and styrene used in the amounts shown in Table 2 are mixed. In the table, MMA and St represent methacrylic acid and styrene, respectively. Further, 240 parts of ethylbenzene and 1.2 parts of n-octyl mercaptan are mixed to prepare a monomer solution in a nitrogen atmosphere. Also, 0.364 parts of 2,2'-azobis(isobutyronitrile) is dissolved in 12.96 parts of ethylbenzene to prepare an initiator solution in a nitrogen atmosphere. These resultant solutions are placed in a glass reactor (volume 2 L) and subjected to reaction at 100° C. for 90 minutes for C4 and at 100° C. for 40 minutes for C5. The resultant polymer solution is mixed with methanol by using a homogenizer and then allowed to stand, and then the precipitate is dried at 120° C. for 6 hours or more by using a circulation-type dryer, thereby producing each of a resin (C4, weight-average molecular weight 97,000) and a resin (C5, weight-average molecular weight 48,000).

TABLE 2

| Polystyrene (meth)acrylate-based compound (C) | Charging amount of monomer (parts by mass) | | | Composition ratio of each constituent unit derived from monomer (%) | | |
| --- | --- | --- | --- | --- | --- | --- |
| | MMA | St | MAH | MMA | St | MAH |
| C2 | — | — | — | 67 | 19 | 14 |
| C3 | — | — | — | 60 | 40 | 0 |
| C4 | 912 | 38 | — | 92 | 8 | 0 |
| C5 | 817 | 133 | — | 81 | 19 | 0 |
| C6 | — | — | — | 80 | 20 | 0 |

—Preparation of Plasticizer—
PL1: adipic acid ester mixture
(Daifatty 101 manufactured by Daihachi Chemical Industry Co., Ltd.)

Examples 1 to 18 and Comparative Examples 1 to 10

—Kneading and Injection Molding—
A resin composition (pellets) is prepared by kneading using a twin-screw kneader (LTE20-44 manufactured by Labtech Engineering Co., Ltd.) at a charging composition ratio shown in Table 3 and a cylinder temperature shown in Table 3.

The resultant pellets are molded into resin molded articles (1) and (2) below by using an injection molding machine (NEX500I manufactured by Nissei Plastic Industrial Co., Ltd.) at an injection peak pressure not exceeding 180 MPa, a cylinder temperature shown in Table 3, and a mold temperature of 60° C.

(1): An ISO multi-purpose dumbbell (measurement part of 10 mm in width and 4 mm in thickness)
(2): A D12 small square plate (dimensions 60 mm×60 mm, thickness 2 mm)
[Evaluation]
The obtained molded articles are evaluated as follows. The evaluation results are shown in Table 3.
—Screw Squeal—
The resultant pellets are plasticized by using an injection molding machine (NEX500I manufactured by Nissei Plastic Industrial Co., Ltd.) at a cylinder temperature shown in Table 3, a mold temperature of 60° C., a number of screw rotations of 100 rpm, and a back pressure of 15 MPa. It is confirmed whether or not squeal is generated during plasticization.
—Tensile Break Strain and Tensile Elastic Modulus—
The tensile break strain and tensile elastic modulus of the resultant ISO multi-purpose dumbbell are measured by a method according to ISO527 using a universal tester (Autograph AG-Xplus manufactured by Shimadzu Corporation).
—Puncture Strength (Resistance to Steel-Ball Drop)—
A steel ball having a diameter of 50 mm and a mass of 500 g is dropped and collided to the resultant D12 small square plate from a height of each of 0.2, 0.4, 0.6, 0.8, and 1.0 m. This test is performed three times at each of the drop heights. The height at which a portion of the square plate is completely broken into plural broken pieces two or more times is evaluated as resistance to steel-ball drop —Haze Value—

The haze value of the resultant D12 small-size square plate is measured by using a haze meter (NDH200 manufactured by Nippon Denshoku Industries Co., Ltd.).

TABLE 3

| | Type and content (parts) of component (A) | Type and content (parts) of component (B) | Type and content (parts) of component (C) | Content of constituent unit derived from styrene in component (C) (%) | (C)/(B + C) | (B + C)/(A) | Plasticizer | Cylinder temperature during kneading and molding (° C.) | Haze (%) | Tensile elastic modulus (MPa) | Tensile breaking strain (%) | Puncture resistance | Screw squeal |
|---|---|---|---|---|---|---|---|---|---|---|---|---|---|
| Example 1 | CE1 = 100 | B1 = 6.5 | C2 = 3.5 | 19 | 0.35 | 0.1 | — | 220 | 2.6 | 2330 | 38 | 0.8 | No |
| Example 2 | CE1 = 100 | B1 = 16.25 | C2 = 8.75 | 19 | 0.35 | 0.1 | — | 220 | 3.5 | 2450 | 34 | 0.8 | No |
| Example 3 | CE1 = 100 | B1 = 8 | C3 = 2 | 40 | 0.2 | 0.1 | — | 220 | 2.9 | 2320 | 31 | 1 | No |
| Example 4 | CE1 = 100 | B1 = 6.5 | C5 = 3.5 | 19 | 0.35 | 0.1 | — | 220 | 2.7 | 2350 | 29 | 1 | No |
| Example 5 | CE1 = 100 | B1 = 6.5 | C6 = 3.5 | 20 | 0.35 | 0.1 | — | 220 | 3.6 | 2330 | 30 | 0.8 | No |
| Example 6 | CE1 = 100 | B1 = 8 | C2 = 2 | 19 | 0.2 | 0.1 | — | 220 | 6.8 | 2320 | 42 | 0.8 | No |
| Example 7 | CE1 = 100 | B1 = 5 | C2 = 5 | 19 | 0.5 | 0.1 | — | 220 | 6.4 | 2360 | 32 | 0.6 | No |
| Example 8 | CE1 = 100 | B1 = 9 | C2 = 1 | 19 | 0.1 | 0.25 | — | 220 | 10.2 | 2300 | 17 | 0.8 | No |
| Example 9 | CE1 = 100 | B1 = 4 | C2 = 6 | 19 | 0.6 | 0.25 | — | 220 | 10.6 | 2350 | 43 | 0.6 | No |
| Example 10 | CE1 = 100 | B1 = 3.9 | C2 = 2.1 | 19 | 0.35 | 0.06 | — | 220 | 2.4 | 2070 | 45 | 0.6 | No |
| Example 11 | CE1 = 100 | B1 = 58.5 | C2 = 31.5 | 19 | 0.35 | 0.9 | — | 220 | 5.6 | 2710 | 14 | 0.6 | No |
| Example 12 | CE1 = 100 | B1 = 2.6 | C2 = 1.4 | 19 | 0.35 | 0.04 | — | 220 | 2.0 | 2020 | 45 | 0.4 | No |
| Example 13 | CE1 = 100 | B1 = 71.5 | C2 = 38.5 | 19 | 0.35 | 1.1 | — | 220 | 7.5 | 2780 | 11 | 0.4 | No |
| Example 14 | CE2 = 100 | B1 = 6.5 | C2 = 3.5 | 19 | 0.35 | 0.1 | — | 220 | 2.1 | 2690 | 17 | 0.6 | No |
| Example 15 | CE3 = 100 | B1 = 6.5 | C2 = 3.5 | 19 | 0.35 | 0.1 | — | 220 | 2.6 | 2410 | 29 | 0.8 | No |
| Example 16 | CE4 = 100 | B1 = 6.5 | C2 = 3.5 | 19 | 0.35 | 0.1 | — | 220 | 3.4 | 1720 | 22 | 1 | No |
| Example 17 | CE5 = 91 | B1 = 7.5 | C2 = 2.5 | 19 | 0.25 | 0.11 | PL1 = 9 | 260 | 6.5 | 3140 | 8 | 0.4 | No |
| Example 18 | CE5 = 83 | B1 = 7.5 | C2 = 2.5 | 19 | 0.25 | 0.12 | PL1 = 17 | 240 | 4.1 | 2640 | 11 | 0.6 | No |
| Comparative Example 1 | CE1 = 80 | B1 = 10 | C1 = 10 | — | 0.5 | 0.25 | — | 220 | 10.2 | 2310 | 29 | 0.2 | Yes |
| Comparative Example 2 | CE1 = 100 | B1 = 3.5 | C1 = 6.5 | — | 0.65 | 0.1 | — | 220 | 14.9 | 2280 | 30 | 0.2 | Yes |
| Comparative Example 3 | CE1 = 100 | B1 = 6.5 | C1 = 3.5 | — | 0.35 | 0.1 | — | 220 | 15.5 | 2260 | 32 | 0.2 | Yes |
| Comparative Example 4 | CE1 = 100 | — | — | — | — | — | — | 230 | 1.4 | 2020 | 51 | 0.2 | Yes |
| Comparative Example 5 | CE2 = 100 | — | — | — | — | — | — | 230 | 1.5 | 2600 | 20 | 0.2 | Yes |
| Comparative Example 6 | CE3 = 100 | — | — | — | — | — | — | 230 | 2.1 | 2190 | 65 | 0.2 | Yes |
| Comparative Example 7 | CE4 = 100 | — | — | — | — | — | — | 230 | 2.7 | 1490 | 30 | 0.2 | Yes |
| Comparative Example 8 | CE5 = 91 | — | — | — | — | — | PL1 = 9 | 260 | 4.4 | 3100 | 8 | 0.2 | Yes |
| Comparative Example 9 | CE5 = 83 | — | — | — | — | — | PL1 = 17 | 230 | 3.8 | 2600 | 13 | 0.4 | Yes |
| Comparative Example 10 | CE1 = 100 | B1 = 6 | C4 = 4 | 8 | 0.4 | 0.1 | — | 220 | 2.9 | 2300 | 31 | 0.4 | Yes |

The results described above indicate that the resin molded articles of the examples have excellent puncture resistance while suppressing a decrease in transparency as compared with the resin molded articles of the comparative examples. Specifically, the resin molded articles of Comparative Examples 1 to 3 contain, in addition to the component (A) and the component (B), the polymethyl methacrylate resin not having the structural unit derived from styrene, that is, the resin molded articles do not have the configuration according to the exemplary embodiment of the invention. The obtained result is that screw squeal is generated, and slightly low puncture resistance is exhibited.

Similarly, with the resin molded articles of Comparative Examples 4 to 9 including only the component (A) or only the component (A) and the plasticizer, the obtained result is that screw squeal is generated, and low puncture resistance is exhibited.

Also, with the resin molded article of Comparative Example 10 using the polymethyl methacrylate resin containing 10% or less of the structural unit derived from styrene, the obtained result is that screw squeal is generated, and slightly low puncture resistance is exhibited.

While with the resin molded articles of Examples 1 to 18 containing, in addition to the component (A) and the component (B), the polystyrene (meth)acrylate-based compound (C) containing 10% by mass or more and 40% by mass or less of the structural unit derived from styrene, the good puncture resistance is exhibited and screw squeal is suppressed.

Also, when as shown by the resin molded articles of Examples 1 to 7, the mass ratio of the polystyrene (meth)acrylate-based compound (C) to the total of the polylactic acid (B) and the polystyrene (meth)acrylate-based compound (C) is 0.15 or more and 0.55 or less, the produced resin molded article has a low haze value, that is, suppressed decrease in transparency, and excellent puncture resistance, as compared with the resin molded articles of Examples 8 and 9 in which the mass ratio is less than 0.15 or exceeds 0.55.

Further, when as shown by the resin molded articles of Examples 1 to 6, the total mass ratio of the polylactic acid (B) and the polystyrene (meth)acrylate-based compound (C) to the cellulose ester compound (A) is 0.05 or more and less than 1, the produced resin molded article has excellent puncture resistance as compared with the resin molded articles of Examples 12 and 13 in which the mass ratio is less than 0.05 or exceeds 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a cellulose ester compound (A);
polylactic acid (B); and
a polystyrene (meth)acrylate-based compound (C) containing 10% by mass or more and 40% by mass or less of a constituent unit derived from styrene, wherein
a weight-average molecular weight (Mw) of the polystyrene (meth)acrylate-based compound (C) is less than 50,000.

2. The resin composition according to claim 1, wherein the cellulose ester compound (A) is at least one selected from cellulose acetate propionate (CAP) and cellulose acetate butyrate (CAB).

3. The resin composition according to claim 2, wherein the cellulose ester compound (A) is cellulose acetate propionate (CAP).

4. The resin composition according to claim 1, wherein the polystyrene (meth)acrylate-based compound (C) is a compound containing 50% by mass or more of a constituent unit derived from a (meth)acrylic acid alkyl ester.

5. The resin composition according to claim 4, wherein the polystyrene (meth)acrylate-based compound (C) is at least one selected from a copolymer of styrene with the (meth)acrylic acid alkyl ester having an alkyl chain having 1 or more and 8 or less carbon atoms, and a copolymer of styrene with the (meth)acrylic acid alkyl ester having an alkyl chain having 1 or more and 8 or less carbon atoms and an unsaturated dicarboxylic acid anhydride.

6. The resin composition according to claim 5, wherein the polystyrene (meth)acrylate-based compound (C) is at least one selected from a copolymer of styrene with methyl methacrylate, and a copolymer of styrene with methyl methacrylate and maleic anhydride.

7. The resin composition according to claim 1, wherein a mass ratio of the polystyrene (meth)acrylate-based compound (C) to a total of the polylactic acid (B) and the polystyrene (meth)acrylate-based compound (C) is 0.15 or more and 0.55 or less.

8. The resin composition according to claim 1, wherein a total mass ratio of the polylactic acid (B) and the polystyrene (meth)acrylate-based compound (C) to the cellulose ester compound (A) is 0.05 or more and less than 1.

9. The resin composition according to claim 7, wherein a content of the cellulose ester compound (A) in the resin composition is 50% by mass or more.

10. A resin molded article comprising the resin composition according to claim 1.

11. The resin molded article according to claim 10, wherein when the resin molded article has a thickness of 2 mm, a haze value is 10% or less.

12. The resin molded article according to claim 10, wherein the resin molded article is an injection molded article.

* * * * *